April 18, 1939. S. B. MARTIN 2,155,019
COLLET
Filed June 4, 1937

INVENTOR.
STODDARD B. MARTIN
BY
ATTORNEYS

Patented Apr. 18, 1939

2,155,019

UNITED STATES PATENT OFFICE 2,155,019

COLLET

Stoddard B. Martin, Lakewood, Ohio

Application June 4, 1937, Serial No. 146,397

5 Claims. (Cl. 279—46)

This invention relates to an improved collet, and particularly to a collet adapted to be used in automatic screw machine apparatus, to hold the stock while the same is being worked.

In the conventional automatic screw machine, a length of rod stock is intermittently advanced and maintained in predetermined advanced position by a work holding chuck or collet which is adapted to embrace circumferentially a portion of the stock immediately adjacent the cutting or machining tools during certain phases of the machine operation, and is adapted to release the stock for a forward advancing movement during other phases of the machine operation.

According to the heretofore accepted practice, the work holding assembly is dismantled and a different collet inserted within the assembly whenever the diameter or shape of the stock to be worked is changed. Altho numerous attempts have heretofore been made to provide a collet with interchangeable stock-gripping pads, the operations involved in changing the stock-gripping pads were so numerous or burdensome, that such apparatus failed to meet the favor of the automatic screw machine industry. Other disadvantages have attended prior attempts to provide a collet having interchangeable stock-gripping pads, such as for instance a loosening of the pads during operation or an unsatisfactory gripping action. The present invention relates principally to an improved type of collet wherein it becomes unnecessary to dismantle the stock feeding apparatus or change the body of the collet in the event it is desired to work stock of different diameters, and wherein the collet is quickly and easily adapted to satisfactorily grip various stock diameters.

It is among the objects of my invention to provide a collet which may be adapted to different sizes of stock and in which a change from one stock size to another may be effected without any changes in the stock feeding mechanism.

It is a further object of my invention to provide a collet wherein a change from one stock size to another may be effected by changing stock-gripping pads adapted to be moved axially of the collet through the forward face of the collet in a manner which obviates the removal of any radially movable collet parts.

It is a further object of my invention to provide a collet having slots or grooves on its forward face adapted to selectively receive and hold interchangeable stock-gripping pads.

It is a further object of my invention to provide a collet according to the preceding object, in which means are provided to secure the work-gripping pads with parts thereof within said grooves or slots.

It is a further object of my invention to provide a collet having interchangeable segmental work-gripping pads carrying radial projections adapted to be received in radial recesses on the forward face of the collet.

Further objects and advantages relating to simplicity of construction and economies of manufacture, will become apparent from the following description and the appended drawing, wherein Figure 1 is a longitudinal sectional elevation of a collet made according to my invention;

Figure 1:
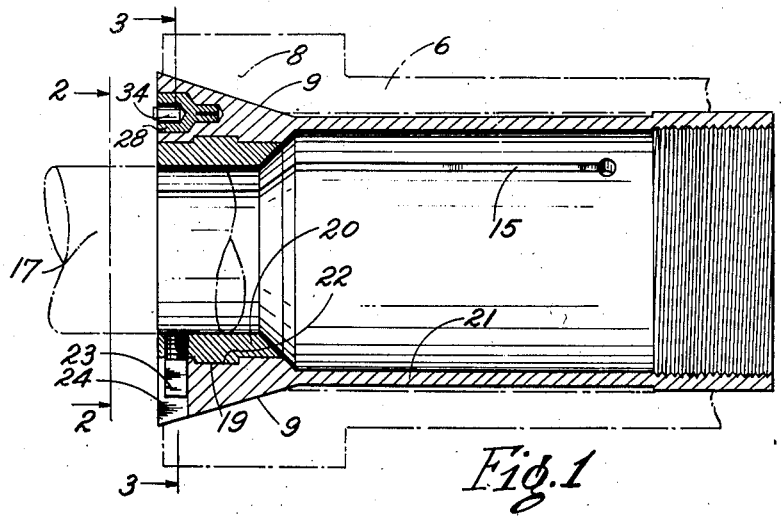

I have illustrated my invention in the environment of a well known automatic screw machine wherein the spindle indicated by the phantom outline as at 6 is adapted to be rotatably supported in the head frame of the machine. Telescopically within the spindle or holder 6 the tubular collet body 21 is disposed and is arranged to reciprocate a limited distance during the gripping and releasing of the stock. During a retracting movement of the collet body 21 the cam face 9 thereon is arranged to bear against the co-operating cam portion 8 of the spindle to effect through a reduction in the diameter across the forward end of the collet body a stock gripping action. The desired flexibility in the forward portion of the collet body may be obtained by slotting the body longitudinally as at 15.

The forward or exposed end of the collet body is preferably provided with a plurality of segmental stock gripping pads 20 arranged to grip the stock 17 which is intermittently advanced through the collet. The outer periphery of the stock gripping pads are provided with an annular rib 22 arranged to seat within an annular groove 19 within the collet body. The stock gripping pads 20 are interchangeable, may be formed of hardened tool steel differing in metal characteristics from the body of the collet and may be suitably knurled or roughened to effect a better grip on the stock during the working thereof. Each of the work gripping pads 20 have securely fixed thereto radially extending holding members 23 which in the preferred form illustrated comprise pins having a squared cross section and a threaded engagement with the work holding pads. It will be appreciated, however, as the description proceeds that the members 23 may be integrally formed with the work holding pads 20 or may comprise pins riveted, welded, or threaded to the work holding pads.

Figure 2:
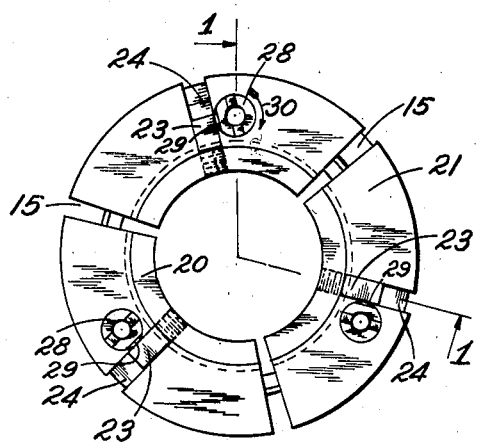
Fig. 2 is an elevation of the forward face of the collet looking along the line 2—2 of Fig. 1.

The forward or exposed end face of the body of the collet 21 is slotted or grooved as at 24, to receive the pins or holding members 23, and it will be appreciated by an inspection of Figure 2 that the work holding pads should be applied one at a time, so that an annular rib 22 on the outer periphery of the pad may pass within the smallest diameter of the forward face of the collet and thereafter be moved radially outward to seat the rib 22 within the groove 19 of the collet.

To effectually secure the radially extending pins 23 within the slots or grooves 24, a rotatable pin 28 having an eccentric head portion is mounted in a bore communicating tangentially with each of said grooves or slots 24. The eccentricity in the head of pin 28 is obtained by grinding away or flattening one side of the pin as at 29, and when the said pins are rotated to position the portion 29 adjacent the groove 24 no portion of the pin projects within the groove. The center of the bore receiving pin 28 is disposed, however, so that upon rotating the flat side of the pin away from the groove 24, the pin will project slightly within the groove, preferably about .010 of an inch.

Figure 4:
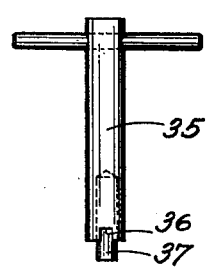
Fig. 4 is an elevation of a key or wrench suited for adjusting a movable part of the collet.
Figure 5:
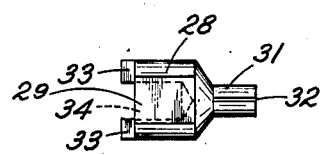
Fig. 5 is an elevation of an adjusting or holding device employed in my collet.

The shank portion 31 of the member 28 is preferably slotted as at 32, and is proportioned with respect to the bore in the collet body receiving the same, so that the shank has a snug frictional fit within said bore. The inherent resilience of the metal of the shank may be such as to maintain a tight pressed fit of the member 28 and retain the member in any position to which it may be turned. The forward face of the pin may be provided with lugs 33 and an axial bore 34 to cooperate with key 35 (Fig. 4) having cut slots 36 and shank 37.

Figure 3:
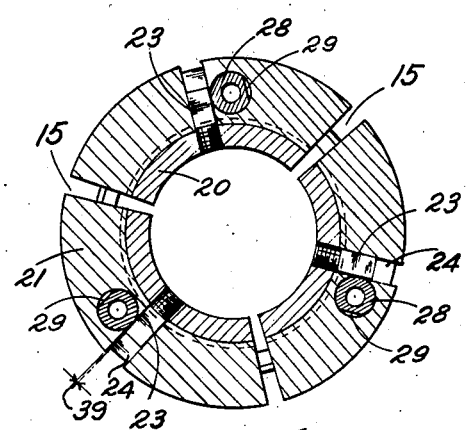
Fig. 3 is a transverse sectional view taken along the line 3—3 of Fig. 1.

Prior to arranging the work-holding pads 20 within the collet, as above described, it will be understood that the pins 28 are rotated so that the flat portions 29 thereof adjoin the groove 24, and subsequent to the arrangement of the pins 23 within the grooves the fastening devices 28 are rotated in the direction of the arrow 30 (Fig. 2), so as to bind or lock the pins 23 and the pads 20 within the collet body. It will be observed that rotation of the fastening devices 28 in the direction of the arrow 30 tends to pull the pins radially outward from the axis of the collet and thus more securely seat the work-holding pads 20 in the groove 19. The binding or locking effect obtained by members 28 may be obtained by merely forcing the pin 23 against the wall of the groove 24 an amount corresponding to the tolerance usually followed in fitting such parts together. For purposes of illustration, however, I have exaggerated, as at 39, (Fig. 3) the movement of the pin within the groove effected by rotating the fastener element 28. I appreciate that other fastening means may be well suited to obtain the securement of the members 23 within the grooves 24, and also appreciate that the members 23 may be slotted or otherwise constructed so as to have a binding frictional fit within the grooves.

During operation, it will be observed that the radial walls of the groove 19 being interlocked with the annular ribs 22 of the work-holding pad, transmit all axial loads from the work-holding pads to the collet and that the members 23 and 28 function to maintain said working position of the work-holding pads. It will also be observed that the construction is such that centrifugal forces occasioned by rotation of the collet will not tend to disturb the proper working position of the work-holding pads 20 or their associated members 23 and 28. By referring again to Fig. 1, it will be noted that to adapt the collet to a diameter of stock other than the diameter of stock 17, it is only necessary to rotate the fastening devices 28 to present the flat sides thereof to the groove 24 and thereafter move the segments 20 radially inward and then outwardly thru the forward face of the collet. It is unnecessary to disconnect or dismantle the body of the collet 21 or change any of the stock feed adjustments or other parts of the screw machine.

The construction and arrangement which I have provided is especially conducive to quick changes from one stock diameter to another and thus to a marked degree reduces the "down time" of the automatic screw machine.

It is also among the advantages of my construction and arrangement, that it becomes unnecessary to carry in stock a large number of collets which are expensive to make and maintain. According to my invention, it is only necessary to provide a plurality of various sized work-holding pads 20, and such pads may be economically formed of a type of steel which would be unsuited or uneconomical if applied to the entire collet body. For instance, the collet body may be formed of a relatively inexpensive machinable stock suited to take the tensile and compression loads to which it is subjected, and the work-holding pads 20 may be formed of the high grade wear-resisting tool steel suited to the repeated stresses of gripping and releasing of the advancing stock.

Altho I have described my invention in the environment of an automatic screw machine, it will be appreciated that the invention is applicable to other work-holding or chucking assemblies. It will also be understood that whereas I have described one embodiment of my invention in considerable detail, numerous modifications may be made therein by those skilled in the art without departing from the scope of the invention as defined by the following claims.

I claim:

1. In a work holding collet comprising a hollow tubular body having slots extending axially inward from its front face forming a plurality of resilient segments adapted to be forced radially inward to grip work, separate work gripping pads mounted on the inner side of said resilient segments, said segments having openings in their front faces extending outwardly from the interior of said hollow body and extending axially inward from said front faces through a distance substantially less than the axial length of said pads, each of said pads carrying an outwardly extending projection fitting within one of said openings and means to secure each of said projections in its respective opening, said means being accessible from the front face of the collet for manipulation to secure or release the pads.

2. In a work holding collet comprising a hollow tubular body having slots extending axially inward from its front face forming a plurality of resilient segments adapted to be forced radially inward to grip work, separate work gripping pads mounted on the inner side of said resilient segments, said segments having slots in their front faces extending outwardly from the interior of said hollow body and extending axially inward from said front faces, through a distance substantially less than the axial length of said pads, each of said pads carrying an outwardly extending projection fitting within one of said slots and means to frictionally bind each of said projections in its respective slot, said means being accessible from the front face of the collet for manipulation to secure or release the pads.

3. In a work holding collet comprising a hollow tubular body having slots extending axially inward from its front face forming a plurality of resilient segments tending to remain open from their inherent resiliency and adapted to be forced inwardly to grip work, separate work gripping pads mounted on the inner side of said resilient segments and fitting within recesses in the segments retaining the pads against axial movement, said segments having openings in their front faces extending outwardly from the interior of said hollow body and extending axially inward from said front faces through a distance less than the axial length of said pads, and said pads carrying outwardly projecting members fitting in said openings, said members being releasable from said openings by manipulation from the front face of the collet to permit removal of the pads.

4. In a work-holding collet comprising a hollow tubular body having slots extending axially inward from its front face forming a plurality of resilient segments adapted to be forced radially inward to grip work, separate work gripping pads mounted on the inner sides of said resilient segments, said segments formed with openings in their front faces extending radially outward from the interior of said hollow body and extending axially inward from said front faces, each of said pads carrying a projection extending radially outward therefrom and having an axial extent substantially less than the axial length of said pad and movable into one of said openings by axial movement of said pad into the interior of said collet and means associated with said projections to secure said pads in position in the collet, said means being accessible from the front face of the collet for manipulation to secure or release the pads.

5. In a work-holding collet comprising a hollow tubular body having slots extending axially inward from its front face forming a plurality of resilient segments tending to remain open from their inherent resiliency and adapted to be forced inwardly to grip work, separate work gripping pads mounted on the inner sides of said resilient segments and having outwardly extending ribs fitting within recesses on the inner sides of the segments, each of said segments having an opening formed in its front face extending radially outward from the interior of said hollow body and axially inward from said front face, and each of said pads carrying a projection adjacent its front face extending radially outward through a greater height than the height of said rib and fitting within one of said openings, means associated with said projections for securing said pads in position in the collet, said means being accessible from the front face of the collet for manipulation to secure or release the pads.

STODDARD B. MARTIN.